United States Patent

Place

[11] 4,181,887
[45] Jan. 1, 1980

[54] AUTOMATIC CHANNEL SELECTOR FOR A TWO-WAY TRANSCEIVER IN A MULTICHANNEL COMMUNICATION SYSTEM

[75] Inventor: Harry Place, Ridgewood, N.J.

[73] Assignee: International Telephone and Telegraph Corporation, Nutley, N.J.

[21] Appl. No.: 812,026

[22] Filed: Jun. 30, 1977

[51] Int. Cl.$^2$ ............................................. H04B 1/38
[52] U.S. Cl. ........................................ 325/15; 325/55; 325/466
[58] Field of Search .................... 325/15, 55, 470, 18, 325/21, 466, 468, 464, 465

[56] References Cited
U.S. PATENT DOCUMENTS

| | | | |
|---|---|---|---|
| 3,651,407 | 3/1972 | Sarallo | 325/55 |
| 3,824,475 | 7/1974 | Pfaasterer | 325/470 |
| 3,919,646 | 11/1975 | Morgan | 325/470 |
| 3,996,522 | 12/1976 | Koch | 325/470 |
| 4,013,958 | 3/1977 | Spayth | 325/55 |
| 4,027,251 | 5/1977 | Fathauer | 325/470 |
| 4,084,138 | 4/1978 | Wycoff | 325/55 |
| 4,092,597 | 5/1978 | Place | 325/55 |

Primary Examiner—Robert L. Griffin
Assistant Examiner—Michael A. Masinick
Attorney, Agent, or Firm—John T. O'Halloran; Alfred C. Hill

[57] ABSTRACT

The channel selector employs a technique in which a tone calling system is combined with a scanner. The combination of these devices provides the user a convenient method of effectively monitoring all channels and automatically selecting the channel upon which communications can take place.

12 Claims, 1 Drawing Figure

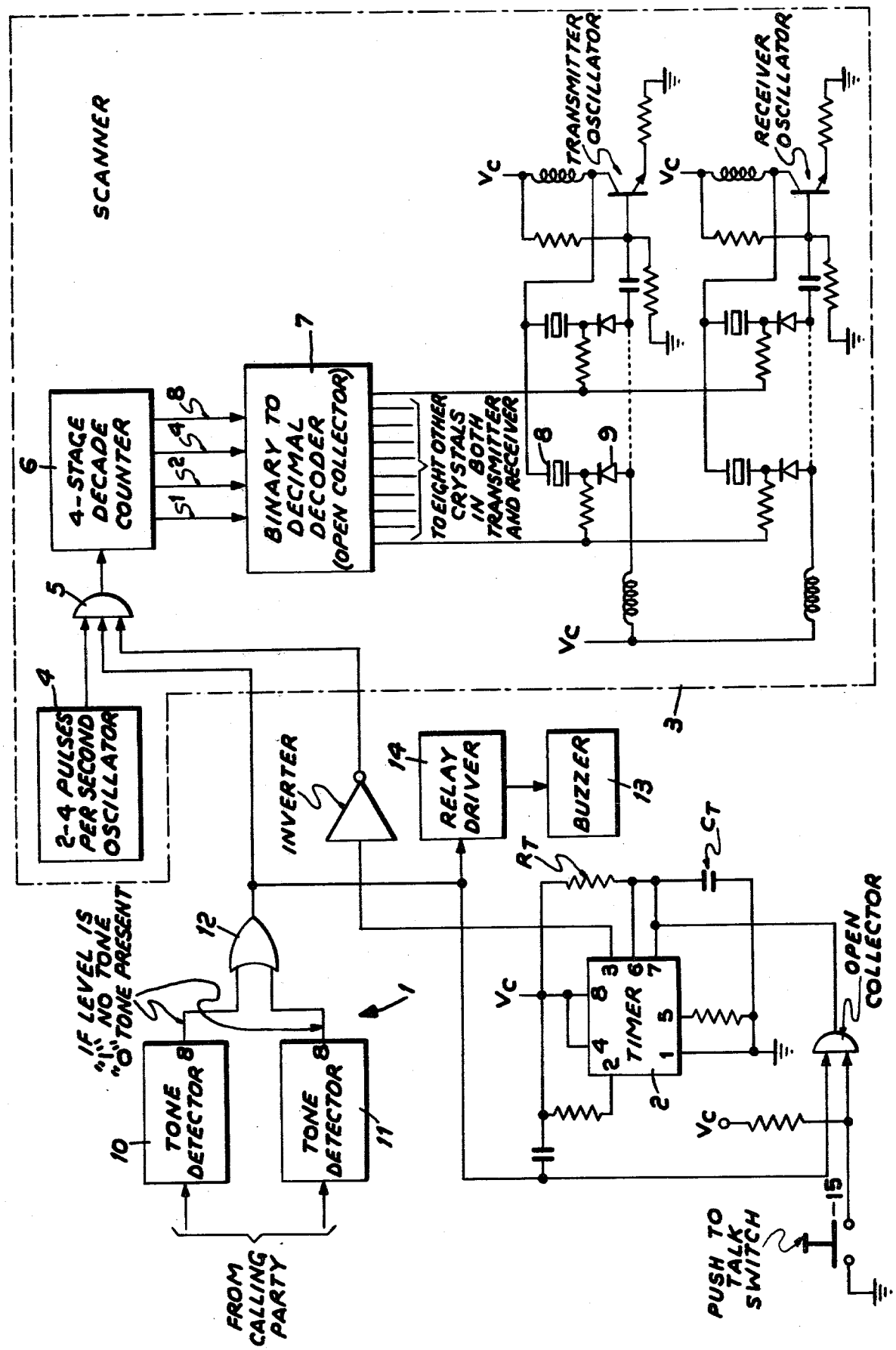

AUTOMATIC CHANNEL SELECTOR FOR A TWO-WAY TRANSCEIVER IN A MULTICHANNEL COMMUNICATION SYSTEM

BACKGROUND OF THE INVENTION

This invention relates to channel selectors and more particularly to an automatic channel selector for a two-way transceiver in a multichannel communication system.

Allotments of two-way radio channels inevitably are becoming more crowded. The user can rarely find single channel service satisfactory, particularly in citizen's band, but also in other business radio bands and must therefore utilize multichannel radio transceivers. The user often must search for an idle channel upon which he may communicate when it becomes necessary to transmit a message. The resultant problem is how to assure that the recipient of the message will be tuned to the channel of the transmitting party.

Operational techniques do exist to overcome this problem. The most common method is to assign a guard channel, upon which all callers initially call in and identify the channel upon which the called party should meet the caller. Alternatively, some base stations simply provide a bank of receivers, each of which is tuned to a different channel. Presently, there is no known automatic technique for channel identification and assignment.

Tone calling systems have been employed in two-way radio systems for the past twenty years, the usual application providing a convenient means for selecting a given radio unit, and providing the called party an audible signal that a call is waiting.

Scanners have operated in the last two to four years, as the result of low cost digital integrated circuit products. They are usually applied to multichannel police and fire receivers in which the scanner continuously scans each channel, stopping upon any channel with signal present (as determined by the breaking of squelch) and remaining upon that channel until cessation of the incoming radio signal at which time the scanning process is resumed. The combination of scanners with tone call systems has not been observed on any commercial products to date, possibly because they are applied to diverse items, i.e. tone calling to transceivers, and scanners to radio receivers only.

SUMMARY OF THE INVENTION

An object of the present invention is to provide a tone calling system combined with a scanner.

A feature of the present invention is the provision of an automatic channel selector for a two-way transceiver in a multichannel communication system comprising: first means to scan each of the channels of the system; and second means coupled to the first means responsive to the simultaneous presence of two different calling tones on a channel to stop the scanning of the first means.

Another feature of the present invention adds to the first and second means a third means coupled to the first and second means to respond to the two different calling tones and to provide a predetermined holding time for the first means on the channel upon which the two different calling tones were received.

Still a further feature of the present invention is in addition to the first, second and third means, a fourth means coupled to the first means and the third means to extend the holding time during a conversation.

BRIEF DESCRIPTION OF THE DRAWING

Above-mentioned and other features and objects of this invention will become more apparent by reference to the following description taken in conjunction with the accompanying drawing, in which the single FIGURE is a block diagram of the automatic channel selector for a two-way transceiver in a multichannel communication system in accordance with the principles of the present invention.

DESCRIPTION OF THE PREFERRED EMBODIMENT

The present invention combines the tone calling system and the scanner such that the scanner continuously listens on each channel for a very short period of time. Any channel upon which the tone call signal is present will cause the scanner to stop upon the channel with the tone present, and remain on that channel for a holding time of about 30 seconds, time enough for the called party to respond. Thus, the called party may answer without regard to the channel since the selection has been accomplished automatically.

During the progress of communications, as the calling and called party continue to communicate, the timer providing the 30 second holding time is repeatedly reset by the operation of the push-to-talk switch in the called party transmitter. Upon cessation of communications, the timer will eventually reach the preset time limit of 30 seconds, and the scanner will return to the scan mode searching for the next call.

Referring to the FIGURE, the present invention includes the combination of a tone call system 1, a resettable electric timer 2, and a digital channel scanner 3. Scanner 3 is stepped or advanced by means of the 2–4 pulses per second oscillator 4. Both of the control legs of the AND gate 5 are high, hence these pulses are passed to the four-stage decade counter 6. Each pulse, as it arrives on the input of counter 6 advances the counter by one step consecutively scanning channels 1–10, and returning to channel 1 after completing the scan of the tenth channel.

A binary to decimal decoder 7 with open collector outputs provides the means for appropriate crystal selection. When the collector is open, the crystal, such as crystal 8, is disconnected, which is the result of no current flowing through the series diode, such as diode 9. The lead for decoder 7 which is selected, allows current flow through the diode, effectively placing the receive and transmit crystals in the respective oscillators of the transceiver and selecting a desired channel. If either of the control legs of AND gate 5 go low, the receiver will remain on the channel last selected.

The tone call system 1, usually a system utilizing two or more different call tones, is illustrated by tone detectors 10 and 11 which may be Signetics Model 567 tone detectors, a phase locked loop tone detector, a standard integrated circuit package. When tone detectors 10 and 11 simultaneously detect two calling tones, the output of each of the detectors 10 and 11 becomes a binary "0", and the output of OR gate 12 becomes a binary "0". The first effect of the receipt of simultaneous tones is that an audible buzzer 13 is sounded through relay driver 14, thus alerting the called party that a call has arrived. The second effect of the receipt of simultaneous tones is that one leg of the AND gate 5 becomes a binary "0", thus preventing the scanner from any further advance. A third effect of the receipt of the simultaneous tones is to trigger the start of 30 second timer 2, such as Signetics Model 555 timer, the output of which also holds a leg of AND gate 5 low preventing further advance of the scanner 3.

The scanner 3 is thus held for a period of at least 30 seconds, thus allowing the called party to answer upon the correct channel without necessitating any selection operation upon the called party's part.

If the called party does not answer within the allotted time, the scanner will resume scanning channels after the 30 second holding time expires, thus restoring the receiver back to the monitor function of all channels.

When the called party does answer, each operation of the push-to-talk switch 15 resets the holding time of the timer 2 where the holding time is determined by the values of resistor $R_T$ and capacitor $C_T$, thus keeping the leg of the AND gate 5 connected to the timer in a binary "0" condition and maintaining connections upon the channel selected by the calling party. Communications between the two parties may continue as long as necessary, however, upon cessation of use by the called party, the 30 second timer 2 will reach the time limit, reset, and thus permit scanner 3 to be incremented by oscillator 4, restoring the receiver to the scan mode of operation.

While the system illustrated in the FIGURE uses a tone call system and scanner, this invention could also include the use of other types of call selection systems, such as digital pulse code modulation, or other digital means for call indication. Also, while the present invention illustrates the use of an electronic integrated circuit timer 2, this does not preclude the use of other types of timers, including mechanical timers, thermistor operated timers, or other timers employed for the express purpose of holding the scanner 3 immobilized for a period of time following the receipt of the call.

While I have described above the principles of my invention in connection with specific apparatus it is to be clearly understood that this description is made only by way of example and not as a limitation to the scope of my invention as set forth in the objects thereof and in the accompanying claims.

I claim:

1. An automatic channel selector for a two-way transceiver in a multichannel communication system comprising:
   first means to scan each of the channels of said system; and
   second means coupled to said first means responsive to only the simultaneous presence of two different calling tones on a channel to produce a control signal to stop the scanning of said first means.

2. A channel selector according to claim 1, wherein said second means includes
   a pair of tone detectors each responsive to a different one of said calling tones, and
   an OR gate coupled to said pair of tone detectors and said first means to provide a control signal when said calling tones are simultaneous to couple said control signal to said first means to stop said first means.

3. A channel selector according to claim 1, wherein said first means includes
   a transmitter oscillator having a different crystal for each channel of said system,
   a receive oscillator having a different crystal for each channel of said system,
   a two to four pulses per second oscillator,
   an AND gate coupled to said oscillator and said second means,
   a four-stage decade counter coupled to said AND gate, and
   a binary to decimal decoder coupled to said counter and each crystal of said transmitter oscillator and said receiver oscillator to sequentially insert associated crystals of said transmitter oscillator and said receiver oscillator into said transmitter oscillator and said receiver oscillator to scan said channels.

4. A channel selector according to claim 3, wherein said second means includes
   a pair of tone detectors each responsive to a different one of said calling tones, and
   an OR gate coupled to said pair of tone detectors and said AND gate to provide a control signal when said calling tones are simultaneous to couple said control signal to said AND gate to stop said first means.

5. A channel selector according to claim 1, further including third means coupled to said first and second means to respond to said two different calling tones and to provide a predetermined holding time for said first means on said channel upon which said two different calling tones were received.

6. A channel selector according to claim 5, wherein said third means includes a timer having a thirty second holding time.

7. A channel selector according to claim 6, further including a fourth means coupled to said timer to extend said holding time during a conversation.

8. A channel selector according to claim 5, further including
   fourth means coupled to said third means to extend said holding time during a conversation.

9. A channel selector according to claim 8, wherein said fourth means includes a push-to-talk switch.

10. A channel selector according to claim 8, wherein said first means includes
    a transmitter oscillator having a different crystal for each channel of said system,
    a receive oscillator having a different crystal for each channel of said system,
    a two to four pulses per second oscillator,
    an AND gate coupled to said oscillator and said second means,
    a four-stage decade counter coupled to said AND gate, and
    a binary to decimal decoder coupled to said counter and each crystal of said transmitter oscillator and said receiver oscillator to sequentially insert associated crystals of said transmitter oscillator and said receiver oscillator into said transmitter oscillator and said receiver oscillator to scan said channels.

11. A channel selector according to claim 10, wherein said second means includes
    a pair of tone detectors each responsive to a different one of said calling tones, and
    an OR gate coupled to said pair of tone detectors and said AND gate to provide a control signal when said calling tones are simultaneous to couple said control signal to said AND gate to stop said first means.

12. A channel selector according to claim 11, wherein said third means includes a timer having a thirty second holding time whose output is coupled to said AND gate.

* * * * *